(12) United States Patent
Pope

(10) Patent No.: US 6,736,722 B1
(45) Date of Patent: May 18, 2004

(54) UNLOADER TUBE CLEANING SYSTEM FOR HARVESTING APPARATUS

(75) Inventor: Glenn E. Pope, Viola, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/309,978

(22) Filed: Dec. 4, 2002

(51) Int. Cl.$^7$ .............................. A01F 12/60
(52) U.S. Cl. ...................... 460/119; 460/80
(58) Field of Search ............. 56/11.2, 10.2 R, 56/208, 16.5, 16.9, 17.2, 14.6, 1; 414/501–505; 198/666; 460/101, 100, 97, 117, 119, 66, 75, 76, 77, 114, 80

(56) References Cited

U.S. PATENT DOCUMENTS

| | | |
|---|---|---|
| 3,880,355 A | 4/1975 | Larson et al. |
| 4,397,319 A | 8/1983 | Schuhmacher |
| 4,400,131 A | 8/1983 | Blake |
| 4,594,840 A | 6/1986 | D'Almeida et al. |
| 4,688,308 A | 8/1987 | Alvarez |
| 4,863,415 A | 9/1989 | Carnewal et al. |
| 4,907,402 A | 3/1990 | Pakosh |
| 5,088,960 A | 2/1992 | Stickler et al. |
| 5,305,493 A | 4/1994 | Prenn |
| 5,507,841 A | 4/1996 | Heckman et al. |
| 5,546,630 A | 8/1996 | Long |
| 5,624,315 A | 4/1997 | Jonckheere |
| 6,058,690 A | 5/2000 | Rutt et al. |
| 6,089,831 A | 7/2000 | Bruchmann et al. |
| 6,285,198 B1 | 9/2001 | Nelson et al. |
| 6,290,361 B1 | 9/2001 | Berzin |

FOREIGN PATENT DOCUMENTS

| | | |
|---|---|---|
| JP | 11137064 A | 5/1999 |
| JP | 2001028938 A | 2/2001 |

OTHER PUBLICATIONS

Deere & Co., 9650STS and 9750STSCombines Manual, 11 pages, (2002).
Larry Reichenberger, "A Shop to Serve Every Need", pp. 1–5, (1999).

Primary Examiner—Robert E. Pezzuto
(74) Attorney, Agent, or Firm—The Law Offices of Randall T. Erickson, PC

(57) ABSTRACT

An air cleanout system is provided for a grain unloader tube for a harvesting apparatus. The unloader tube has an auger therein and a plurality of air nozzles located at least partially within the unloader tube. The air nozzles have air outlets directed substantially longitudinally within the tube to deliver air into the tube to effect cleaning of grain and residue from the unloader tube. A pressurized air manifold is flow-connected to the plurality of air nozzles. The air nozzles comprise nozzle housings that penetrate a wall of the unloader tube, the housings having a tapered profile in an upstream direction within the tube to minimize resistance to grain flow through the tube during normal unloading operation. The nozzles are arranged longitudinally spaced apart along the tube. The nozzles of the plurality can be sequentially operated in a direction along the tube from an upstream end toward a tube outlet.

7 Claims, 6 Drawing Sheets

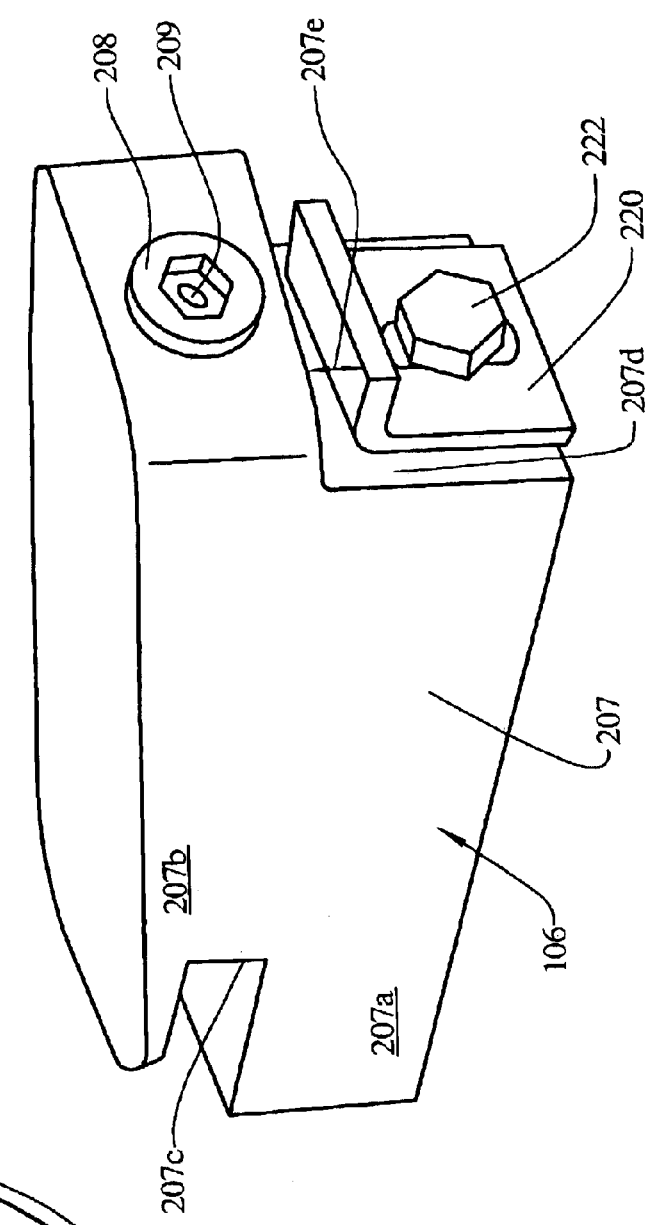

UNLOADER TUBE CLEANING SYSTEM FOR HARVESTING APPARATUS

TECHNICAL FIELD OF THE INVENTION

The invention relates to harvesting apparatus, such as combines. Particularly, the invention relates to a cleanout system for an unloader tube of a grain compartment of a harvesting apparatus.

BACKGROUND OF THE INVENTION

Horticultural crops may be classified as edible crops, inedible crops, genetically modified organisms (GMO's), non-GMO, organic, pesticide-free, or in accordance with other crop attributes. Inedible crops may include crops such as fiber, cotton or rubber, for example. Genetically modified crops may include vegetables that are genetically manipulated to hold their shelf life longer than traditionally cultivated vegetables. Organic crops are harvested from plants that are grown without exposure to certain pesticides, herbicides or other chemicals.

Crops may be grown to specific crop attributes or specifications. Crop attributes may be based on the genetic composition of a crop, the growing practices for a crop, or both. For example, a certain variety of corn may be grown that has greater oil content than other varieties because of genetic or environmental factors. Similarly, a certain variety of soybeans may be grown that has a different protein content or other crop attribute that is desirable. A processor, a pharmaceutical company, a manufacturer or another concern may desire to purchase agricultural products with specific crop attributes from a grower or another supplier. The grower or supplier may wish to charge a premium for crops with specific crop attributes compared to a commodity-type crop. The purchaser of the agricultural product may desire sufficient assurance that the agricultural product that is being purchased actually possesses the crop attributes that are sought.

A need exists to accurately identify crops with specific crop attributes throughout the growing and distribution of crops with specific crop attributes and any products derived therefrom. Further, a purchaser of an agricultural product or a crop may desire or demand the ability to trace the identity of the crop with specific crop attributes to verify the presence of the crop attributes, or the absence of undesired attributes, as a condition for a commercial transaction.

Thus, there is a need to segregate crops during harvesting such that no mixing of crops or crop residue with different attributes occurs. Thus, after harvesting a crop, a harvesting apparatus, such as a combine, is preferably cleaned each time before its use in harvesting a subsequent crop having different attributes.

The typical time and effort to completely remove all the grain and residue from the combine is very long and the task difficult. One of the more difficult problems in the cleanout procedure is cleaning the horizontal unloader tube. There is limited access and no effective method to inspect the tube for adequate cleaning.

The present inventor has recognized that in order to ensure segregation of crops with different attributes, it would be desirable if the combine, particularly the unloader tube, could be thoroughly cleaned of grain and residue between harvesting of crops of different attributes.

SUMMARY OF THE INVENTION

The invention provides an air nozzle system and an air nozzle design for use in cleaning areas of a harvesting apparatus.

An exemplary embodiment of the invention provides an air cleanout system for a grain unloader tube for a harvesting apparatus, such as a combine. The unloader tube has an auger therein and a plurality of air nozzles located at least partially within the unloader tube. The air nozzles have air outlets directed substantially longitudinally within the tube to deliver high velocity air streams into the unloader tube to effect cleaning of grain and residue from the unloader tube. A pressurized air manifold is flow-connected to the plurality of air nozzles.

The air nozzles can comprise nozzle housings that penetrate a wall of the unloader tube, the housings having a tapered profile in an upstream direction within the tube to minimize resistance to grain flow through the tube during normal unloading operation.

The nozzles are arranged longitudinally spaced apart along the tube. The nozzles are preferably located about 45 degrees up from a bottom of the tube, the nozzles being oriented with air outlets directed at about 10 degrees downward from horizontal.

A method of cleaning grain from an unloader tube is provided including the steps of: providing a plurality of air nozzles inside the tube, the air nozzles of the plurality arranged longitudinally spaced apart; and using the nozzles, directing air into the tube to move grain from the tube and in and around the auger out of the tube outlet.

The auger can be turned while the air is directed into the unloader tube to assist in the cleaning operation.

The nozzles of the plurality can be sequentially operated, and operated in groups of nozzles, in a direction along the tube from an upstream end toward a tube outlet.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 4 is a fragmentary perspective view of a portion of the unloader tube;

FIG. 5 is a perspective view of an air nozzle shown in FIG. 4;

DETAILED DESCRIPTION OF THE PREFERRED EMBODIMENTS

Figure 1:
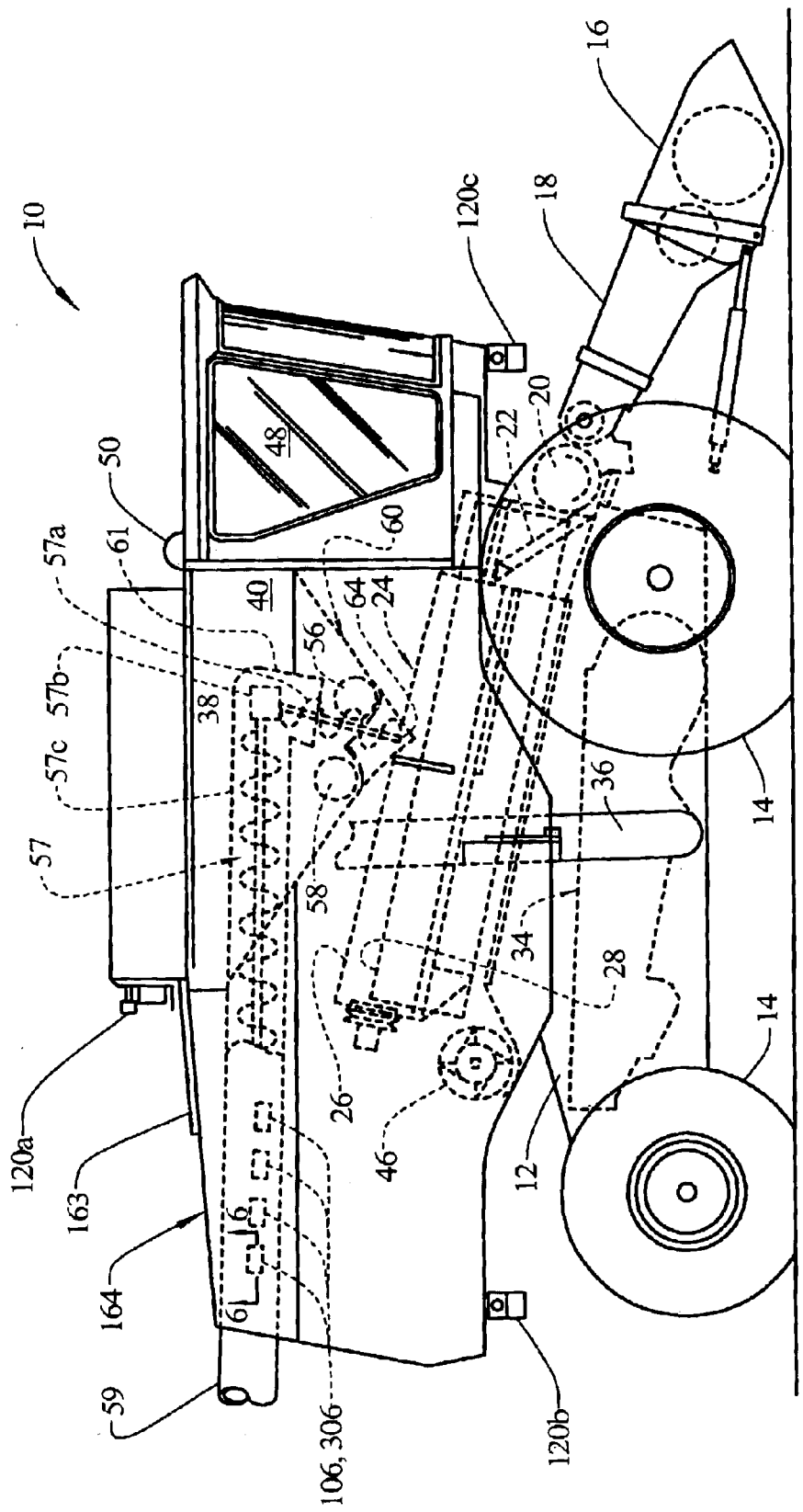
FIG. 1 is a schematic elevation view of a harvesting apparatus that incorporates the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
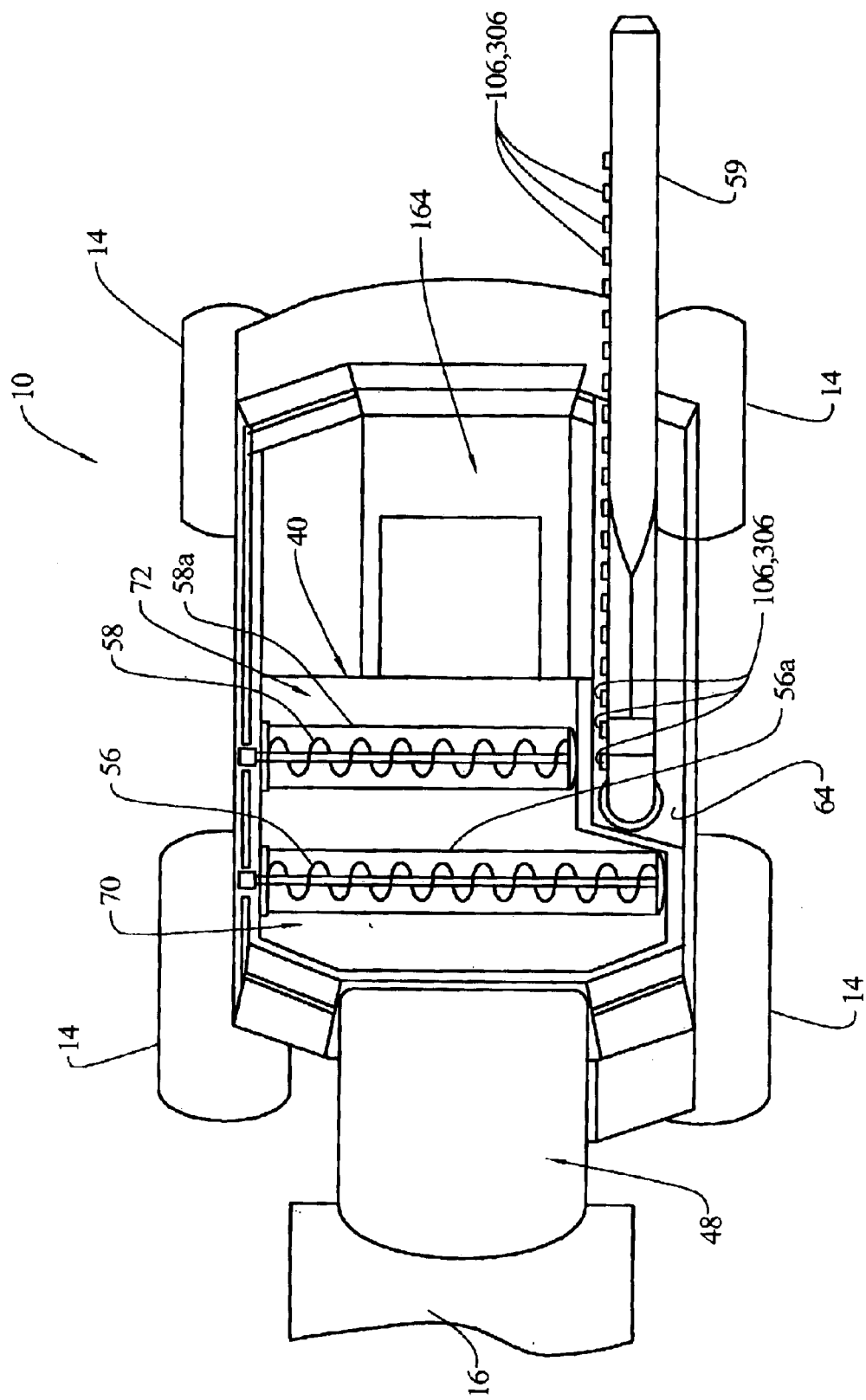
FIG. 2 is a schematic plan view of the harvesting apparatus of FIG. 1.

FIGS. 1 and 2 illustrate a harvesting apparatus, such as an agricultural combine 10. Such combines are of a type described for example in U.S. Pat. No. 6,285,198, herein incorporated by reference, and are also of the type commercially available as a JOHN DEERE 9650 STS or 9750 STS combine. Although the invention is being described as being incorporated into a rotary combine, it may also be used on other combines, such as conventional straw walker machines.

FIG. 1 shows an agricultural combine 10, also known as a combine thresher. The combine 10 comprises a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between, and supported by the sidesheets of the combine.

The axial crop processing unit 24 comprises an axial rotor housing 26 and an axial rotor 28 located in the housing. The harvested crop enters the housing through the inlet transition section 22. The rotor is provided with an infeed portion, a threshing portion and a separating portion. The rotor housing has a corresponding infeed section, a threshing section and a separating section.

Both crop processing portions, the threshing portion and the separating portion, are provided with crop engaging assemblies. The threshing section of the rotor housing is provided with a concave and the separating section is provided with a grate. Grain and chaff released from the crop mat falls through the concave and the grate. The concave and grate prevent the passage of crop material larger than grain or chaff from entering the cleaning system 34.

As illustrated in FIG. 1, grain and chaff falling through the concave and grate is directed to cleaning system 34 which removes the chaff from the grain. The clean grain is then directed by a clean grain elevator 36 to a fountain auger 38. The fountain auger 38 directs the grain into a grain tank or grain compartment 40. The clean grain elevator 36 and the fountain auger 38 comprise a means for moving the clean grain from the grain floor of the combine to a storage bin formed by the grain tank 40. The grain is removed from the grain tank 40 by unloading auger 57. As the straw reaches the end of the crop processing unit it is expelled through an outlet to a beater 46. The beater 46 propels the straw out the rear of the combine. The operation of the combine is controlled from the operator's cab 48.

When the clean grain compartment is to be unloaded, transverse unloading augers 56 and 58 direct the grain to the side of the compartment where it comes into contact with an unloading auger 57 which directs the clean grain through a vertical unloading tube 61 and a horizontal unloading tube 59. The auger 57 includes a vertical section 57a, at least partially within the tube 61, a right angle gear 57b, and a horizontal section 57c within the tube 59. During an unloading operation, tube 59 would normally be extended outwardly from the side of the combine so that clean grain can be more readily directed into a wagon or truck.

The grain compartment 40 includes a trough 60, which includes a major trough region 70 and a minor trough region 72 that house the horizontal augers 56, 58, respectively. The trough 60 is open to a charge housing or sump 64. The vertical auger section 57a extends through the vertical tube 61 and into the sump 64. The grain which is fed through the trough horizontally by the horizontal augers 56, 58 is delivered into the sump 64 and is removed by the vertical auger section 57a through the tube 61, and by the horizontal auger section 57c through the tube 59.

Figure 3:
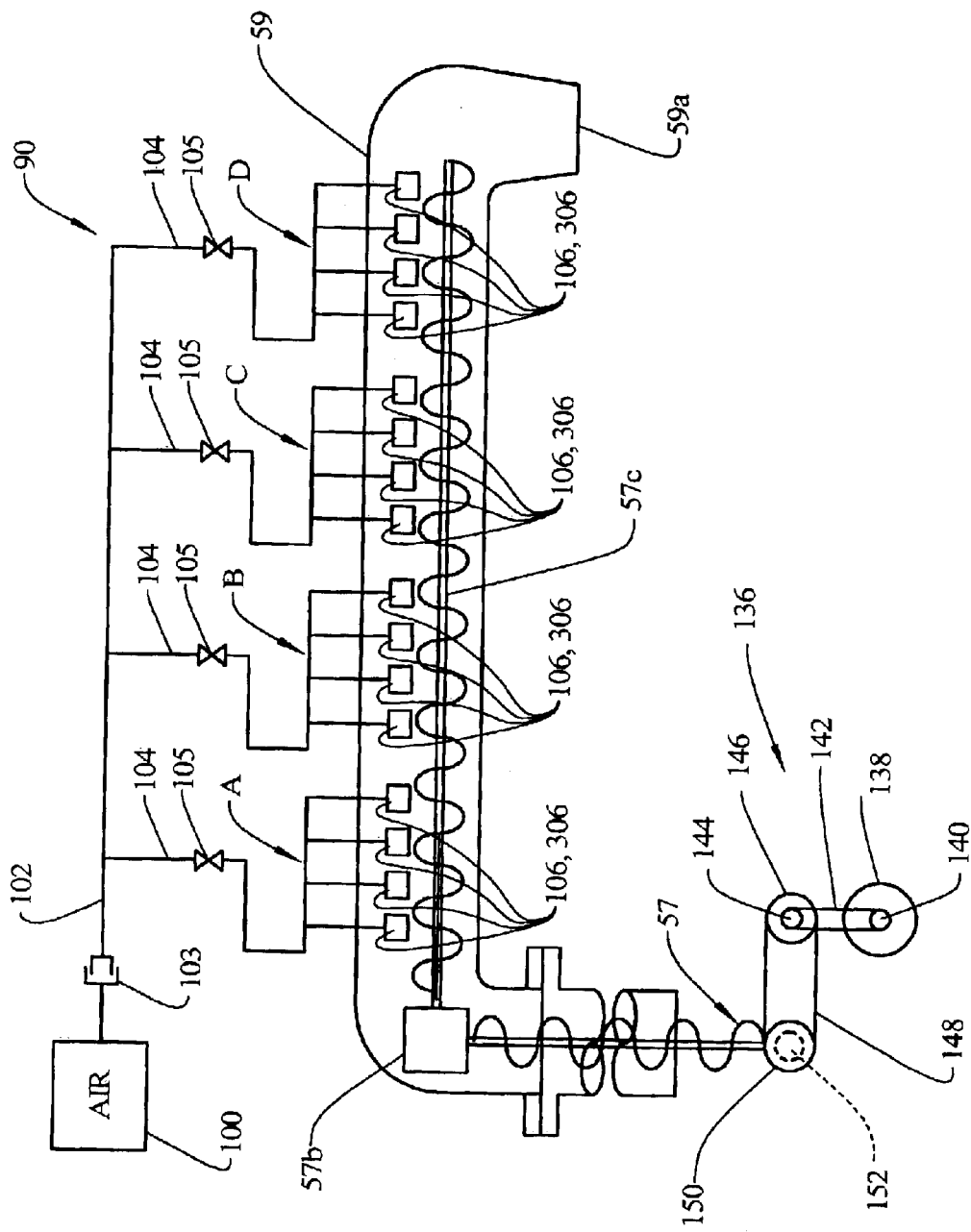
FIG. 3 is a schematic diagram of a pressurized air cleaning system of the invention.

FIG. 3 illustrates in schematic fashion an air cleaning system 90 of the invention. An air supply 100 delivers pressurized air into a manifold 102 via a quick connect coupling 103. Alternatively, a threaded or other type coupling can be used. The air supply 100 can be external to the combine 10. The manifold 102 includes branch lines 104 that deliver air to stationary nozzles 106 or alternate nozzles 306 (as described below). A shutoff valve 105 is provided in each branch line 104. As described below, pressurized air is provided to the nozzles 106, 306 to clean grain and residue from the tube 59.

To enhance the cleaning operation, the auger 57, including the horizontal auger section 57c, is slowly turned by a rotary power system 112. A rotary power system 112 for slowly turning the auger 57 during cleanout is described in more detail in U.S. application Ser. No. 10/309,977, filed on the same day as the present application, and identified by attorney docket No. 6301P0070US, herein incorporated by reference.

The rotary power system includes a 12 volt DC motor 138 that, when activated during cleanout operation, drives a pulley 140 that drives a belt 142. The belt 142 drives a pulley 144 that drives a sprocket 146 that in normal grain unloading operation is driven at high speed by the combine drivetrain. The sprocket 146 drives a chain 148 that drives a sprocket 150 that drives a right angle gear 152 that turns the auger 57. During cleanout operation, the relatively small motor 138 drives the auger 57 at a slow speed.

FIG. 4 illustrates the horizontal unloader tube 59 in perspective cross-section. One nozzle 106 is shown. The nozzle 106 includes a nozzle body 207 that delivers pressurized air to a nozzle element 208 having a discharge orifice 209. The nozzle body 207 extends into the tube 59 and the nozzle element 208 is opened toward a downstream end of the tube 59. The nozzle 106 is located at an angle G up from a 0 degree bottom of the tube 59. Preferably the angle G is approximately 45 degrees. The orifice 209 of the nozzle element 208 is directed downwardly at approximately an angle H. The angle H is preferably about 10 degrees.

One nozzle 106 is illustrated in FIG. 5. The nozzle body 207 includes a base block portion 207a and an inside block portion 207b. A slot 207c is formed in the base block portion 207a adjacent to the inside block portion 207b at an upstream end of the nozzle body 207. At a downstream end of the base block portion 207a the inside block portion 207b overhangs the base block portion 207a. A clamp bracket 220 is fastened with a bolt 222 to a downstream face 207d of the base block portion 207a. A gap 207e is formed between a bottom surface of the inside block portion 207b and a top surface of the bracket 220. The bracket includes a slot 120a for sliding the bracket 220 tight against a combine wall 223, such as the wall of the unloader tube 59, before the bolt 122 is tightened. An alternate design for the nozzle includes a plastic, snap-in nozzle body shaped similarly to the aforementioned nozzle body, including the base block portion and the inside portion formed as a unitary structure, that requires no clamping hardware.

Figure 6:
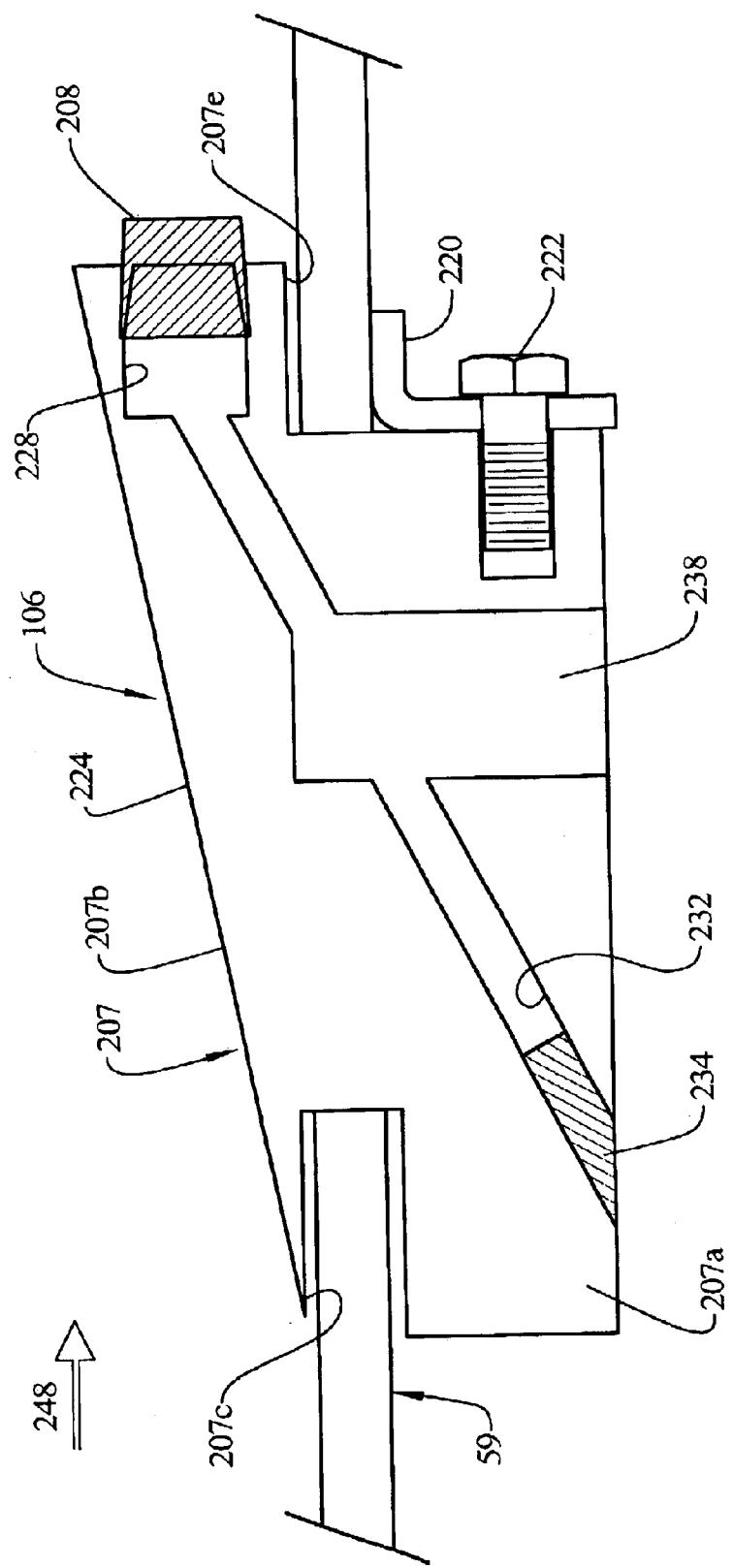
FIG. 6 is a sectional view taken generally along line 6—6 in FIG. 4.

As shown in FIG. 6, the nozzle 106 includes the nozzle element 208 which is threaded into an opening 228 in the inside block portion 207b. A through bore 232 is plugged with a weld plug 234 after its formation through the base block portion 207a and the inside block portion 207b. The through bore 232 connects to the opening 228. The nozzle element 208 can be installed using an Allen wrench to thread the element 208 into the opening 228 in the nozzle body 207. An inlet bore 238 extends substantially perpendicular to a bottom face of the base block portion 207a and intersects the through bore 232. The inlet bore 238 is threaded to accept an air supply fitting.

The inside block portion 207b is tapered to form an inclined top surface 244 that increases in distance from the inside surface of the tube 59 in the direction of grain flow 248. Because of this taper, the nozzle body 207 is protected from undue wear from impingement by grain, and also plugging of the unloader auger with grain due to grain flow drag or interference within the tube is also prevented.

The nozzle 106 is installed onto, and into, a rectangular opening 250 in the wall 223. The slot 107c receives a portion of the wall 223 and the bracket 220 is slid against the wall 223 and the bolt 222 is tightened to capture the wall 223. The inside block portion of 107b is effectively inside the wall 223 and the base block portion 107a is effectively outside the wall 223. According to the exemplary embodiment, the nozzle body 107 extends into the tube 59 approximately 12 mm and clears the auger flights by about 4 mm.

Figure 7:
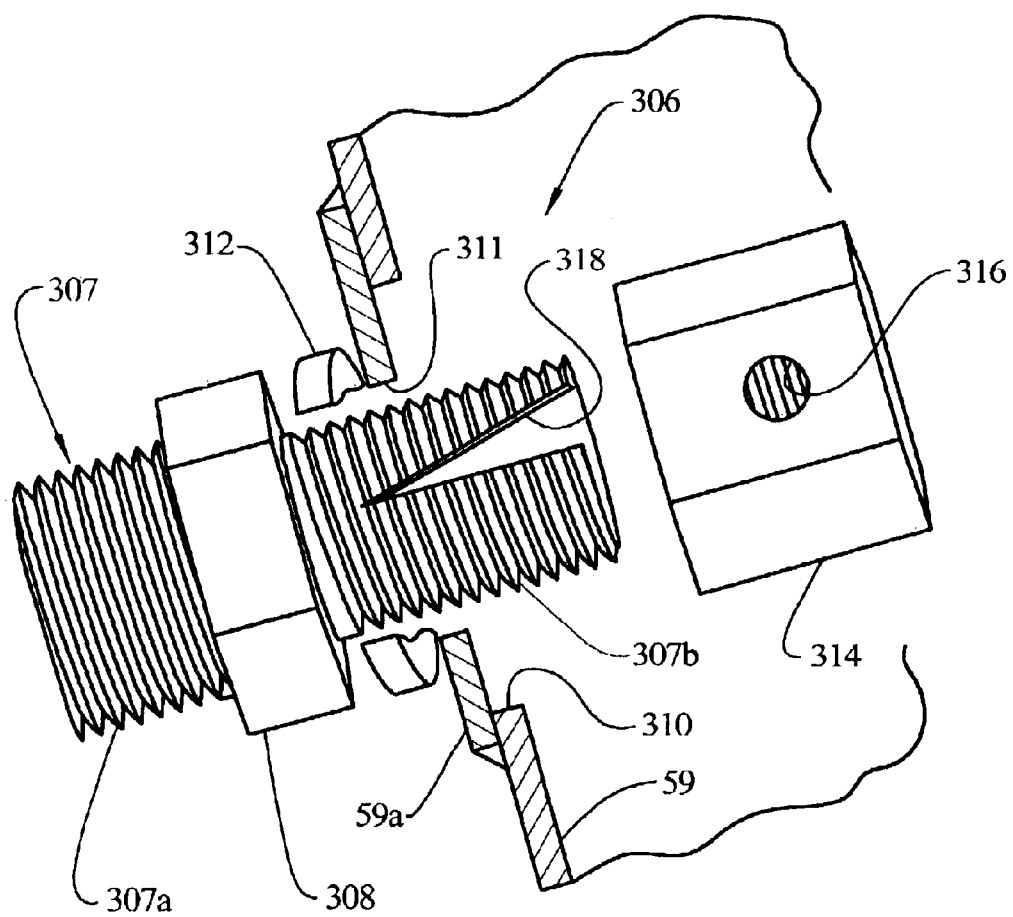
FIG. 7 is an enlarged, exploded perspective view, shown partly in section, all of an alternate embodiment nozzle mounted to the unloader tube.

FIG. 7 illustrates an alternate nozzle 306. The nozzle 306 includes a nozzle body 307 having a threaded, tubular base portion 307a and a threaded tubular inside portion 307b, separated by a wrench-engageable block 308. The base portion 307a receives a threaded, pressurized air connection (not shown). The inside portion 307b is inserted through a hole 310 in the auger tube 59. The inside portion 307b also passes through a hole 311 formed through a mounting plate 59a that is welded to the tube 59. A lock nut 312 and a hex cap 314 are threaded onto the inside portion 307b to clamp the nozzle 306 to the plate 59a. The hex cap 314 includes an orifice 316, and the inside portion 307b includes a triangular slot 318. By selecting the position of the hex cap 314 along the length of the inside portion 307b, the effective size of the air opening through the orifice 316 from inside the inside portion 307b can be adjusted. The lock nut 312 is then positioned along the inside portion 307b to clamp the plate 59a against the hex cap 314.

By use of this nozzle 306, the orientation of the orifice 316 inside the tube 59 can be easily changed by loosening the lock nut 312 and reorienting the body 307. Preferably, the orifice is positioned at about 1–2 mm above the inside surface of the tube 59.

The air cleaning system 90 was tested on an unloader tube of a JOHN DEERE 9750 STS combine, having an inside diameter of about 13 inches, and a length of about 20 feet. Four groups A, B, C, D of four nozzles 306 were used, each group served by a separate branch line 104 and shutoff valve 105. Given the length of the tube 59, the nozzle spacing was equal to about 14 inches (about 350 mm) along the tube 59. The nozzles each had an effective 3⁄32 inch diameter orifice 316 that was located at the angle G on the tube 59 (see FIG. 4) equal to about 45 degrees, and aimed downwardly at the angle H (see FIG. 4) equal to about 10 degrees. While the horizontal auger section 57c was slowly turned, the groups A, B, C, D of nozzles 306 were sequentially charged with pressurized air at about 80 psig, from group A, the nozzles 306 closest to the right angle gear 57b, to group D, the nozzles 306 closest to an open end 59a of the tube 59, for a period of about 10 seconds for each group A, B, C, D. Very effective cleaning results were achieved.

A method of the invention for cleaning grain from an unloader tube is provided includes the steps of: providing a plurality of fixed air nozzles 106, 306 inside the tube 59, the air nozzles of the plurality arranged longitudinally spaced apart; and using the nozzles, directing air into the tube to move grain along the tube, and in and around the auger 57c, and out of the tube outlet 59a.

The nozzles of the plurality can be sequentially operated, and operated in groups A, B, C, D of nozzles, in a direction along the tube 59 from an upstream end adjacent to the right angle gear 57b toward the tube outlet 59a. Preferably, each group of nozzles should be operated for about 30 seconds to ensure complete cleaning.

To enhance the cleaning operation, the horizontal auger section 57c can be slowly turned while the nozzles 106, 306 are operated, i.e., discharging high velocity air streams into the tube 59.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a grain unloader tube for a harvesting apparatus, the unloader tube having an auger therein, the improvement comprising:

a plurality of air nozzles located at least partially within said unloader tube, said air nozzles having air outlets directed substantially longitudinally within said tube to deliver air into said tube to effect cleaning of grain from the unloader tube;

pressurized air tubing that is flow-connected to said plurality of air nozzles.

2. The improvement according to claim 1, wherein said air nozzles comprise nozzle housings that penetrate a wall of said unloader tube, said housings having a tapered profile in an upstream direction within said tube to minimize resistance to grain flow through said tube during normal operation.

3. The improvement according to claim 1, wherein said plurality of nozzles is arranged longitudinally spaced apart along said tube.

4. The improvement according to claim 1, wherein each of said nozzles is located about 45 degrees up from a bottom of the tube, said nozzles oriented with air outlets directed at about 10 degrees downward from horizontal.

5. A method of cleaning grain from an unloader tube, the unloader tube having an auger therein, and a tube outlet, comprising the steps of:

providing a plurality of air nozzles inside said tube, said air nozzles of said plurality arranged longitudinally spaced apart; and using said nozzles, directing air into said tube to move grain from said tube and around said auger out of said tube outlet.

6. The method according to claim 5, wherein said step of directing air is further defined in that said nozzles of said plurality are sequentially operated.

7. The method according to claim 6, wherein said nozzles of said plurality are sequentially operated in a direction along the tube from an upstream end toward said tube outlet.

* * * * *